US011198257B2

(12) United States Patent
Odenthal

(10) Patent No.: US 11,198,257 B2
(45) Date of Patent: Dec. 14, 2021

(54) FLAP-BAG MANUFACTURE

(71) Applicant: LEMO Maschinenbau GmbH, Niederkassel-Mondorf (DE)

(72) Inventor: Hartmut Odenthal, Troisdorf (DE)

(73) Assignee: LEMO MASCHINENBAU GMBH, Niederkassel-Mondorf (DE)

( * ) Notice: Subject to any disclaimer, the term of this patent is extended or adjusted under 35 U.S.C. 154(b) by 108 days.

(21) Appl. No.: 16/341,384

(22) PCT Filed: Oct. 27, 2017

(86) PCT No.: PCT/EP2017/077673
§ 371 (c)(1),
(2) Date: Apr. 11, 2019

(87) PCT Pub. No.: WO2018/078133
PCT Pub. Date: May 3, 2018

(65) Prior Publication Data
US 2020/0247069 A1 Aug. 6, 2020

(30) Foreign Application Priority Data

Oct. 27, 2016 (DE) .......................... 102016120582.6

(51) Int. Cl.
*B29C 65/00* (2006.01)
*B29C 65/02* (2006.01)
(Continued)

(52) U.S. Cl.
CPC .......... *B29C 65/7847* (2013.01); *B29C 65/02* (2013.01); *B29C 65/7897* (2013.01);
(Continued)

(58) Field of Classification Search
CPC ..... B31B 70/022; B31B 70/024; B31B 70/04; B31B 70/64; B31B 70/94; B31B 70/984;
(Continued)

(56) References Cited

U.S. PATENT DOCUMENTS 3,462,026 A * 8/1969 Maccherone .......... B65H 29/06
414/27
3,633,731 A * 1/1972 Jones ..................... B65H 29/40
414/27
(Continued)

FOREIGN PATENT DOCUMENTS

DE 3808764 A 9/1989
DE 3937509 A 6/1990

OTHER PUBLICATIONS

Lemo Bag Machine, published by Polygraphica UK on Feb. 13, 2015 and retrieved from URL https://www.youtube.com/watch?v=fJ4RmM_o0Ek on Jan. 8, 2021 (Year: 2015).*
(Continued)

*Primary Examiner* — Valentin Neacsu
(74) *Attorney, Agent, or Firm* — Andrew Wilford

(57) ABSTRACT

The invention relates to a method for producing and depositing a bag, in particular a flap bag (1), wherein the bag has a base, a filling opening and, in a pocket region (3), two layers, and the two layers are welded together at least in the region of a side seam (6) of the bag, wherein the bag is then moved by means of at least one transport arm (9) to a depositing device and during the movement is held on the transport arm (9) by means of negative pressure, characterised in that the at least one transport arm (9) is oriented parallel to the side seam (6) of the bag, and after welding of the two layers, as a result of which the side seam (6) is formed, the side region of the bag is placed on the transport arm (9) and during movement to the depositing device and up until depositing, the bag is held on the transport arm (9) by means of negative pressure.

3 Claims, 3 Drawing Sheets

(51) Int. Cl.
  *B29C 65/78* (2006.01)
  *B31B 70/02* (2017.01)
  *B31B 70/04* (2017.01)
  *B31B 70/64* (2017.01)
  *B31B 70/94* (2017.01)
  *B31B 70/98* (2017.01)
  *B31B 160/10* (2017.01)
  *B29L 31/00* (2006.01)

(52) U.S. Cl.
  CPC .......... *B29C 66/43* (2013.01); *B29C 66/8511* (2013.01); *B31B 70/022* (2017.08); *B31B 70/04* (2017.08); *B31B 70/64* (2017.08); *B31B 70/94* (2017.08); *B31B 70/984* (2017.08); *B31B 70/988* (2017.08); *B29L 2031/7128* (2013.01); *B31B 2160/10* (2017.08)

(58) Field of Classification Search
  CPC .............. B31B 70/988; B31B 2160/10; B65H 2301/426; B29C 65/02; B29C 65/7847; B29C 65/7897
  USPC ............. 493/189, 204, 196; 53/570; 414/27, 414/790.4; 198/692, 817
  See application file for complete search history.

(56) References Cited

U.S. PATENT DOCUMENTS

| | | | | |
|---|---|---|---|---|
| 4,668,148 | A | 5/1987 | Sample | |
| 4,699,607 | A * | 10/1987 | Lambrecht | B31B 70/00 493/204 |
| 4,735,602 | A * | 4/1988 | DeBin | B65H 31/26 493/196 |
| 4,758,214 | A * | 7/1988 | deBin | B31B 70/00 493/196 |
| 4,954,033 | A * | 9/1990 | Sanders | B65G 57/04 198/817 |
| 5,056,202 | A * | 10/1991 | Stiegler | B31B 70/00 29/33 P |
| 5,069,659 | A * | 12/1991 | Bochtler | B31B 70/00 493/194 |
| 5,085,111 | A * | 2/1992 | Birkhofer | B31B 70/00 493/204 |
| 5,931,581 | A * | 8/1999 | Garberg | B65D 33/20 383/62 |
| 6,149,565 | A * | 11/2000 | Meyer | B31B 70/00 493/22 |
| 6,453,646 | B1 * | 9/2002 | Schneider | B65B 43/14 493/199 |
| 6,575,219 | B1 * | 6/2003 | Schulze | B29C 65/7437 156/513 |
| 6,711,882 | B1 * | 3/2004 | Schneider | B31B 19/98 53/241 |
| 6,793,613 | B2 * | 9/2004 | DeSmedt | B65H 29/06 414/27 |
| 2002/0134702 | A1 * | 9/2002 | DeSmedt | B65D 33/001 206/554 |
| 2006/0070351 | A1 * | 4/2006 | Hudetz | B31B 70/00 53/410 |

OTHER PUBLICATIONS

WT-650 Wicketer Machine up to 350 cycles/minute, published by GUR-Is Bag Making Machines on Apr. 27, 2014, retrieved from URL https://www.youtube.com/watch?v=EXs63OblzAs on Jan. 8, 2021 (Year: 2014).*

* cited by examiner

FLAP-BAG MANUFACTURE

CROSS REFERENCE TO RELATED APPLICATIONS

This application is the US-national stage of PCT application PCT/EP2017/077673 filed 27 Oct. 2017 and claiming the priority of German patent application 102016120582.6 itself filed 27 Oct. 2016.

FIELD OF THE INVENTION

The invention relates to a method of making and depositing a bag, and to an apparatus comprising a production apparatus for making, and depositing a bag that has a floor, a filling opening and, in a pocket region, two layers are welded to each other at side edges of the bag.

BACKGROUND OF THE INVENTION

A production apparatus with which a bag is manufactured is known. For this purpose, two layers of material are placed one above the other such that a filling opening is formed on the one side. For example, the floor is present on the opposite side of the opening. The two sides of the material are welded to each other in a suitable manner, with heat being admitted into this region or heat arising and the resulting side seam permanently connecting the two side edges of the two layers of material to each other only after a certain time. Up to this point, the joined-together side region is still plasticized and susceptible to actions of force, which can lead to an impediment of the joining connection after the plasticization.

After the bag has been manufactured, with the floor being able to be formed by folding over the two layers of material or else by welding the two sides, this bag is moved by a transport arm toward a depositing apparatus. The transport arm here is provided at an upper end of the bag, which end faces away from the floor, wherein this upper end is deposited onto the transport arm and held by negative pressure. During the holding of the upper end of the bag, the transport arm is moved, for example pivoted, specifically toward the depositing apparatus. Each bag that has been manufactured by the production apparatus is then steadily deposited there such that a stack of bags is formed. After a predetermined number of bags has been stacked, this stack is transported away, and therefore a new stack is created, with this operation being repeated for as long as desired. The series production of bags is therefore provided.

The conventional formation of packets or the transport of the bags on suction arms onto the stacking pins conceals a quality risk, particularly in the case of large bag formats and great film thicknesses.

The bag can be held only at the outer edge in the region of the filling opening, in the case of flap bags in the region of the (single-layered) flap, so that the bag can be placed onto the stacking pins of a depositing apparatus. In the double-layered region, the bag, after being deposited, can be supported again only in the bag center and then once again at the lower edge. Up to this point, there is no support during the movement to the depositing apparatus, and therefore external movement forces and also intrinsic movement forces act on the flap bag.

The bag is manufactured, for example, in such a manner that the (single-layered) flap region lies at the bottom (faces downward toward the floor on which the entire apparatus is erected; together with that layer of the material, in the extension of which the flap extends; this layer of the material then likewise faces downward while the second layer faces upward) and is then picked up from the bottom by the rotating suction arm pairs and, rotated by 180° (flap then at the top, together with that layer of the material, in the extension of which the flap extends; this layer of the material then likewise faces upward, while the second layer now faces downward), deposited onto the stacking pins.

In this rotational phase, the seam, in particular the two side seams, of the bag is still plasticized (i.e. is not yet cured because of the action of heat during the melting operation). The rotational movement causes the non-supported, double-layered region to sag downward due to its own weight and to pull on the sides of the seams that are still hot and plasticized. This can lead to damage of the seams and therefore to waste during production.

OBJECT OF THE INVENTION

The invention is based on the object of improving a method of making and depositing a bag and an apparatus comprising a production apparatus for making, and comprising a depositing apparatus for depositing, a bag.

SUMMARY OF THE INVENTION

In respect of the method, it is provided according to the invention that the at least one transport arm is oriented parallel to the side seam of the bag, and, after the welding of the two layers, as a result of which the side seam is formed, the side region of the bag is placed onto the transport arm and the bag is held on the transport arm by negative pressure during movement to the depositing apparatus and up until deposition. This has the advantage that no forces act on the welded region of the two layers in the side region of the bag when this bag after leaving the production apparatus is moved toward the downstream depositing apparatus. It is therefore avoided that the side region of the bag is not moved during the movement phase in which the side seam of the bag is still plasticized (i.e. has not yet completely achieved the desired fixed joining connection), in order now to realize the entirely desired fixed joining connection. This is achieved in that the side region of the bag is completely positionally fixed on the at least one transport arm by negative pressure during the movement after leaving the production apparatus up until the depositing apparatus and therefore no external forces, in particular by a movement of the two layers of the material of the bag, act on the welded region. This region therefore has time to cure in order to be able to form the necessary fixed joining connection. This advantageously effectively avoids tearing open the side seam during the later use of each bag. The quality of the bag manufactured in such a manner is thereby substantially improved.

In a development of the invention, there are two transport arms oriented parallel to each other, and a side seam is in each case made on a respective transport arm after the welding and is held there by negative pressure during movement of the bag to the depositing apparatus up until deposition of the bag. As a result, the two side regions in which the side seams have been formed are supported by a respective transport arm in order, during the movement of the bag to the depositing apparatus after leaving the production apparatus, to prevent external forces or forces due to an intrinsic movement of the bag from acting on the side seams that have not yet plasticized, wherein in particular the intrinsic movements of the bags during the movement could weaken the side seams that have not yet cured, which would lead to tearing during later use of the bag. This is avoided by the described positional fixing during the movement.

In a development of the invention, it is provided that after the welding that forms the side seam, the bag is moved by the at least one transport arm in a rotational manner to the depositing apparatus. By means of such a rotational movement from the production apparatus to the depositing apparatus, a continuous production and depositing operation can be effected, with which a large number of bags can be manufactured one behind another within a short time and deposited to form a stack without the strength of the connection of the two side seams of the two layers of the bag being weakened during the movement since the time for the movement, in particular the rotational movement of the transport arm, is used in order to allow the welded connection to cure during this time without external forces or intrinsic forces of the bag acting on this welded region.

In a development of the invention, a flap bag, as the bag, is manufactured, moved and deposited on the depositing apparatus using the method, and, after its production and during its movement, the flap bag rests with its side region. Both the side seam and also partially a flap are located on the transport arm. As a result, not only is the strength of the welded connection increased, but also the bag flap, which is composed of a single-layered material, is held and guided in a specific manner. This permits a purposeful depositing of the flap bag with its flap on the depositing apparatus.

In respect of the apparatus comprising a production apparatus for making, and comprising a depositing apparatus for depositing, a bag, it is provided according to the invention that the at least one transport arm is oriented parallel to the side seam of the bag, and, after the welding of the two layers, as a result of which the side seam is formed, the side region of the bag is placed onto the transport arm and the transport arm has at least one opening that provides a negative pressure and via which the bag is held on the transport arm by negative pressure during the movement to the depositing apparatus and up until deposition. In a particular refinement, the at least one opening, preferably a plurality of openings, lies or lie in the region in which the two layers welded to each other are located, in order to stabilize this region during the movement of the bag after leaving the production apparatus until up to deposition of the bag on the depositing apparatus in order for the welded region of the side seam to be able to cure during this time.

In a development of the invention, the transport arm has a plurality of openings provided one behind another in a row. This openings provided one behind another in a row provide a negative pressure in order to pull the side region of the bag onto the transport arm and to hold same there ideally plane-parallel to the transport arm while the transport arm moves, in particular is pivoted. The openings provided one behind another in a row can lie precisely on the line of the side seam, but could also be provided differently therefrom.

In a development of the invention, parallel to the plurality of openings provided one behind another in a row, the transport arm has a further row of openings provided one behind another in a row. Two rows of openings that are identical to or different from one another are therefore introduced parallel to each other into the surface of the transport arm in order to form a contact area in which the two side seams, which are welded to each other, of the bag are held after the bag leaves the production apparatus and during the movement of the transport arm up until deposition of the bag. In this case, no external forces or else intrinsic forces whatsoever of the bag can act on the welded region, and therefore the strength of the finished welded connection is thereby significantly increased once again.

In a development of the invention, the transport arm has a recess, wherein the recess is provided at the point where the transport arm during its movement is moved passed the depositing apparatus, in particular an end region of a depositing apparatus configured approximately in the shape of a beam. This permits a continuous rotational movement of the transport arm, and therefore the latter can continue to rotate after depositing a bag on the depositing apparatus, in order not only to move passed the depositing apparatus, but to pass again into a position behind the production apparatus, in which this transport arm can pick up the next bag manufactured in order to transport same away toward the depositing apparatus.

With regard to the transport arm, it has previously been explained that this transport arm has at least one opening via which a negative pressure is generated, with which the bag is held on the transport arm while the transport arm moves from the production apparatus toward the depositing apparatus. It goes without saying that corresponding means are present that not only generate a negative pressure, but that also the generated negative pressure is conducted from the source toward the at least one opening in the transport arm.

In a development of the invention, the bag is a flap bag, wherein, after its production and during its movement, the flap bag rests with its side region, in which both the side seam and also partially a flap are located, on the transport arm. The same explanations and the same resulting advantages as have already been explained with respect to the associated method apply here.

In other words, the transport arm (also to be called suction arm) can therefore hold the bag in an edge region, in particular can hold the flap bag at the outer edge on the flap, and on the double-layered region. For this purpose, the outer edge of the suction arm preferably obtains a further row of holes. The recess is necessary in order to allow space for the stacking pins of the depositing apparatus, with which stacking pins the suction arm would otherwise collide in the downward movement. The recess can differ in size depending on the format of the bag.

With this wide suction arm provided with two rows of holes, the upper and the lower film side of the bag is uniformly supported and fixed such that the hot seam is no longer stressed by the sagging of the lower side of the bag, but rather the two film layers are fixed by the negative pressure via the holes in the suction arms.

The seam quality and the production speed can therefore be increased in an advantageous manner.

An embodiment of an apparatus according to the invention and of a method according to the invention will be described below in conjunction with a flap bag. However, the invention is not restricted to the flap bag shown and described, but rather can also be used for other forms of bags.

SPECIFIC DESCRIPTION OF THE INVENTION

Figure 1:
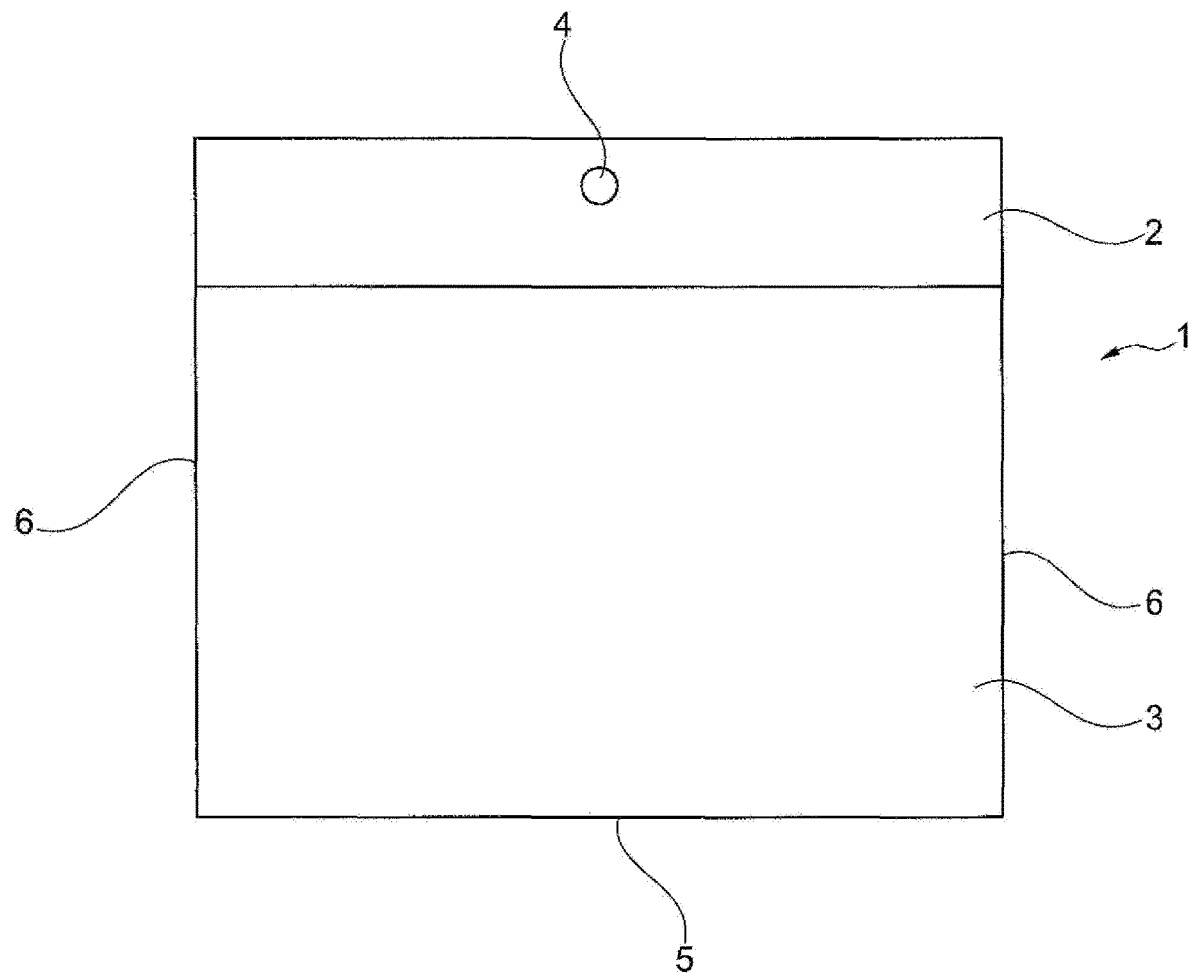
FIG. 1 is a plan view of a bag according to the invention.

FIG. 1 shows a flap bag 1 that has a flap 2 composed of a single layer of material. The flap 2 takes up only a small part of the overall area of the flap bag 1, and therefore a pocket region 3 composed of two layers of material makes up a larger region. At least one stacking hole 4 (in general an opening) can, but does not have to be, formed in the flap 2. This at least one stacking hole 4 fits the completely manufactured flap bag 1 over a corresponding stacking pin of a depositing apparatus where it is deposited.

Provided opposite the flap 2 is a floor 5 that is formed either by folding over the two layers of the material or by seaming or another suitable joining connection of the two layers of the material. Furthermore, the flap bag 1 has two sides that extend between the ends of the flap 2 and the floor 5. These side regions each form a side seam 6 that is formed by a suitable joining connection, in particular by welding, of the two layers of the material. In a production apparatus that is not illustrated specifically, but is known, the flap bag 1 shown in FIG. 1 is manufactured and transferred to a conveyor having at least one transport arm, preferably two transport arms provided parallel to each other, so that this flap bag can be moved toward the depositing apparatus by the conveyor.

Figure 2:
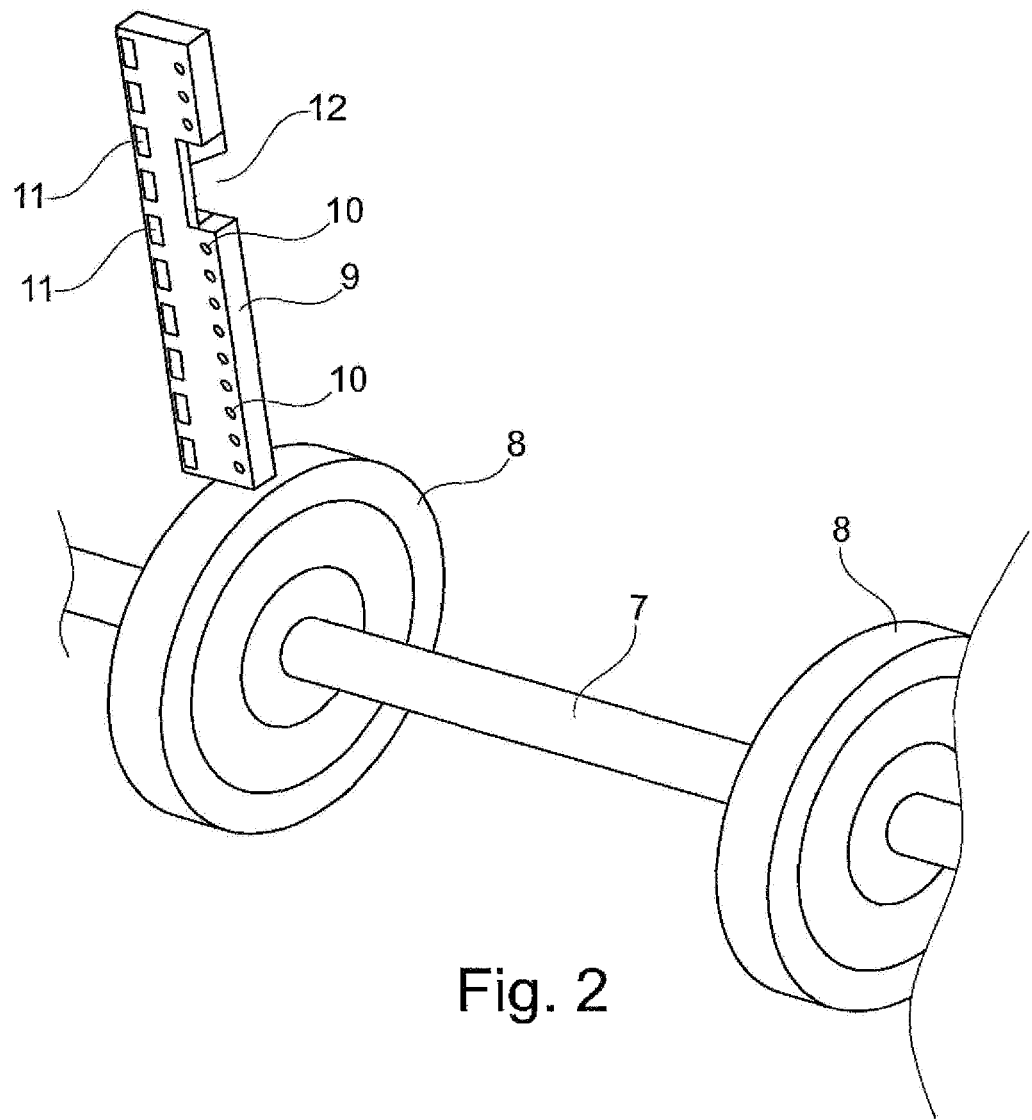
FIG. 2 is a partial perspective view showing a single arm of the bag conveying apparatus.

FIG. 2 shows by way of example one such transport apparatus that has a drive shaft 7 that can be rotated by a corresponding drive. A support 8 on which at least one transport arm 9 is provided is provided on the drive shaft 7. In practice, a plurality of transport arms 9 are provided on the support 8 distributed around the circumference. In addition, in practice, there is not only the one support 8 but, as illustrated in FIG. 2, there is a further support 8 spaced therefrom. The distance between the two supports or the opposite transport arms 9 provided thereon corresponds approximately to the width of the flap bag 1 between the two side seams 6.

The transport arm 9 has at least one opening 10, and, in this embodiment, a plurality of openings 10 or holes are provided one behind another in a row. In addition, there can be, but does not have to be, a further opening 11, in particular a further row of openings 11 provided one behind another, in the transport arm 9. In a preferred manner, the openings 10 form a first row of openings one behind another, while the openings 11 are also provided one behind another in a row parallel to the row of the openings 10. The cross section of the openings 10, 11 can be identical or different from one another. Similarly, the cross section of the openings 10 in the row one behind another or the cross section of the openings 11 in the other row one behind another can be identical or different. Not illustrated, but present, in the illustration in FIG. 2 are means for generating a negative pressure that is conducted either via the drive shaft 7 and via the support 8 and also via the transport arm 9, designed in the manner of a hollow body, to the openings 10 and/or 11. It is also conceivable for the drive shaft 7 to take over the actual driving of the support 8 and for the generated negative pressure to be conveyed in a suitable manner via the support 8 toward the transport arm 9. Finally, the transport arm 9 can have, but also does not have to have, a recess 12. This recess 12 is then present and required if the transport arm 9 is rotated about the drive shaft 7 and the depositing apparatus on which each bag is stacked is located between the two transport arm 9 provided parallel to each other. This means that the side seams 6 of the flap bag 1 (or of a bag in a different type of format) are fixed on the surface of the transport arm 9 where the openings 10, 11 are located, and is held at least by the row of openings 10 provided one behind another (or in a region between the two rows of openings provided parallel one behind another) and preferably also by the row of openings 11 provided one behind another.

Figure 3:
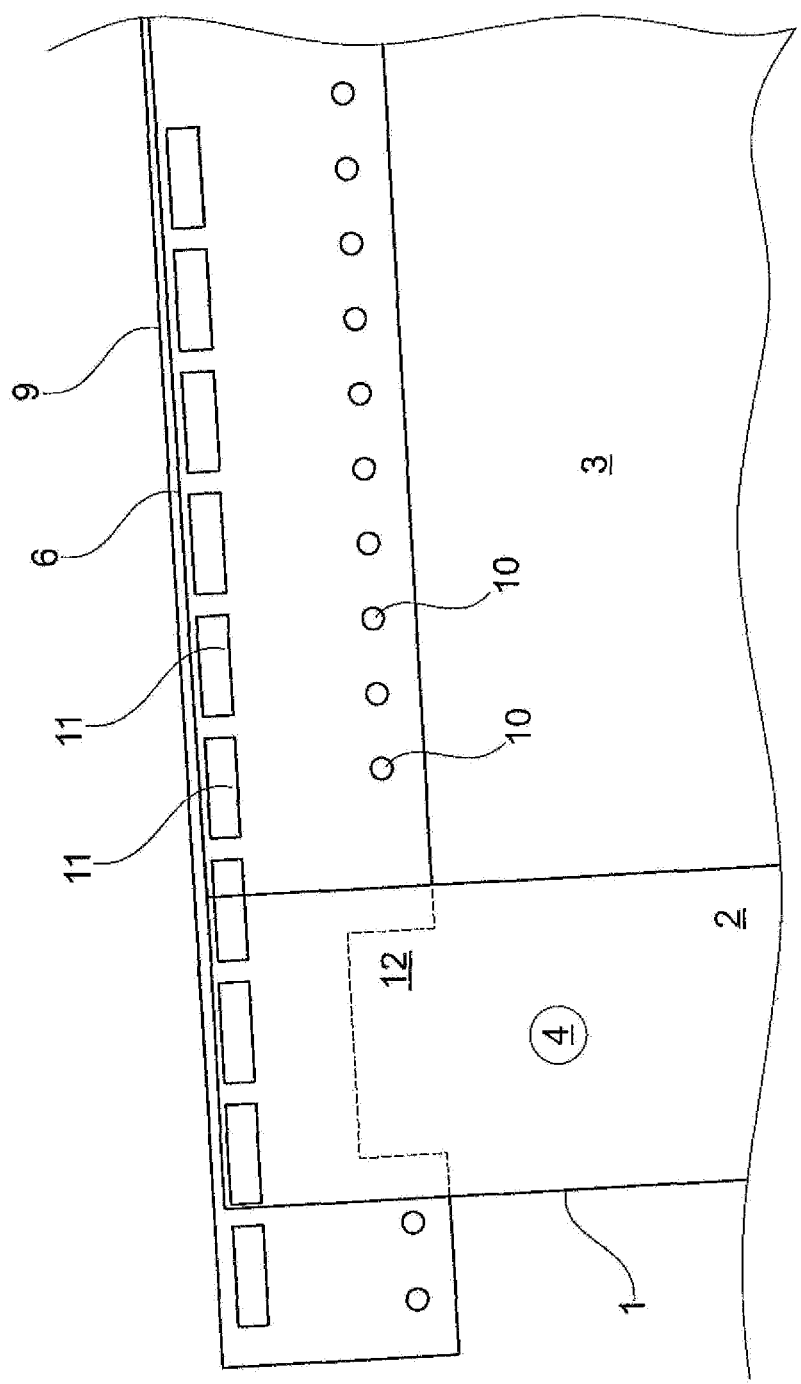
FIG. 3 is a large-scale detail view of a bag held in the transport arm.

FIG. 3 finally shows the position in which the flap bag 1 rests on the surface of the transport arm 9 after it has left the production apparatus. It can be seen in the embodiment shown that the side region and the side seam 6 rest on a substantial part of the surface of the transport arm 9, and therefore this region is fixed in position by the openings 10 and 11 during movement of the transport arm 9. It is alternatively conceivable that the side seam 6 lie in a region between the two rows formed by the openings 10, 11 or is provided only in the region in which the row of openings 10 is located one behind another. During movement of the flap bag 1 after leaving the production apparatus, the region around the side seam 6 in which the still plasticized joining region of the two layers of material is located is therefore protected against the action of external forces (for example by movement of the transport arm) and of intrinsic forces of the flap bag 1, and therefore the joining region can cure during the movement and can form a stable connection between the two material layers. At the moment at which the two transport arms 9 are moved past the in particular beam-shaped depositing apparatus, the flap bag 1 with its at least one stacking hole 4 can be placed in a specific and guided manner onto a stacking pin of the depositing apparatus. At this moment, either the negative pressure can be relieved by specific activation of the means that generate the negative pressure, or the flap bag 1 is automatically released from the surface of the transport arm 9 when this flap bag comes to rest on the in particular beam-shaped surface of the depositing apparatus. Of course, it is conceivable here for the negative pressure to be such that it first fixes the flap bag 1, in particular in the region of its side seam 6, reliably on the surface of the transport arm 9 during movement of the transport arm 9, but second does not lead to damage to the flap bag 1 when the latter is released from the surface of the transport arm 9 and has then come to rest on the depositing apparatus.

Even in the case of the production described above and the transport described and the deposition described, the bag is initially manufactured in such a manner that the single-layered flap 2 lies at the bottom (faces downward toward the ground on which the entire apparatus is erected; together with that layer of the material, in the extension of which the flap 2 extends; this layer of the material then likewise faces downward, while the second layer faces upward) and is then picked up from the bottom by the two rotating transport arms 9 provided parallel to each other and, rotated by 180° (flap 2 then at the top, together with that layer of the material, in the extension of which the flap 2 extends; this layer of the material then likewise faces upward, while the second layer now faces downward), deposited onto the stacking pins (or comparable means) of the depositing apparatus.

The invention claimed is:

1. A method of making a bag, the method comprising the steps of sequentially:
thermally plasticizing and welding together two layers to form the bag with two welded and parallel side edges;
adhering by negative pressure each of the two welded side edges while still plasticized with a respective transport arm with each side edge oriented parallel to the respective transport arm;
jointly displacing the transport arms and layers adhered thereto at the side edges so as to transport the bag along a path while curing the plasticized side edges; and after curing of the plasticized side edges, releasing the bag from the respective arms and thereby depositing the bag.

2. The method according to claim 1, wherein the bag is moved along the path by rotation of the transport arms to a depositing apparatus.

3. The method according to claim 1, wherein prior to deposition, the bag rests with its side edges on the transport arm.

* * * * *

UNITED STATES PATENT AND TRADEMARK OFFICE
CERTIFICATE OF CORRECTION

| | | |
|---|---|---|
| PATENT NO. | : 11,198,257 B2 | Page 1 of 1 |
| APPLICATION NO. | : 16/341384 | |
| DATED | : December 14, 2021 | |
| INVENTOR(S) | : Hartmut Odenthal | |

It is certified that error appears in the above-identified patent and that said Letters Patent is hereby corrected as shown below:

On the Title Page

Item (73), second Line:
Replace Assignee's Address with: "Michael-Lehmacher-Straße 1, 53859 Niederkassel (DE)"

Signed and Sealed this
Twenty-first Day of October, 2025

John A. Squires
*Director of the United States Patent and Trademark Office*